UNITED STATES PATENT OFFICE.

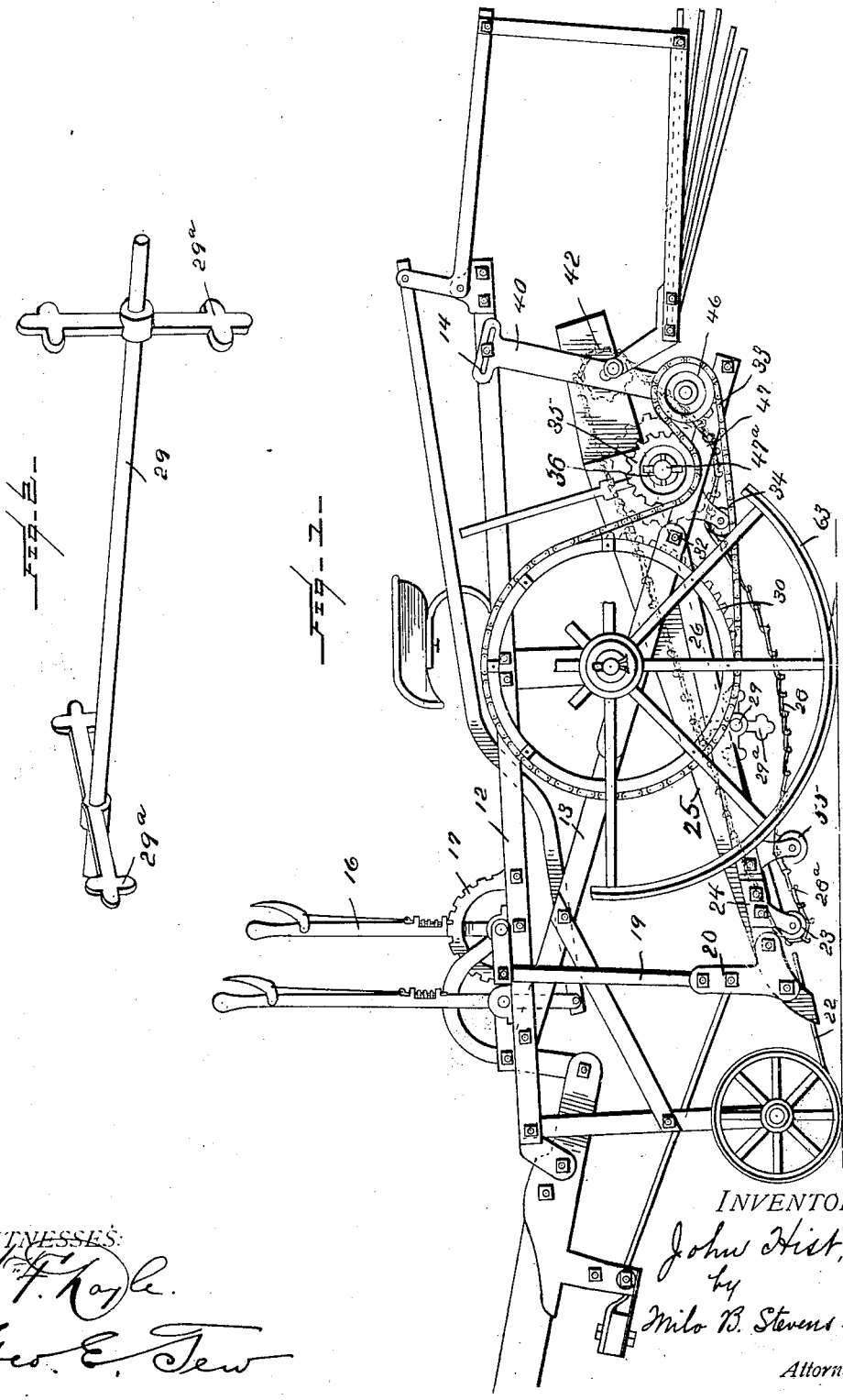

JOHN HIST, OF SOLON, OHIO.

POTATO-DIGGER.

No. 809,260.  Specification of Letters Patent.  Patented Jan. 2, 1906.

Original application filed February 11, 1905, Serial No. 245,208. Divided and this application filed May 9, 1905. Serial No. 259,561.

*To all whom it may concern:*

Be it known that I, JOHN HIST, a citizen of the United States, residing at Solon, in the county of Cuyahoga and State of Ohio, have invented new and useful Improvements in Potato-Diggers, of which the following is a specification.

This application is a division of my pending application, Serial No. 245,208, filed February 11, 1905, for potato-digger, and the invention to which the present application is confined is described hereinbelow and relates especially to the traveling endless carrier and the means for driving, adjusting, and agitating the same.

In the accompanying drawings, Figure 1 is a side elevation of the machine. Fig. 2 is a perspective view of the agitator which shakes the carrier.

The particular construction of the machine is fully specified in the application above referred to and will not be referred to herein except so far as may be necessary to give a clear understanding of the construction and operation of the parts hereinafter claimed.

The shovel 22 is carried by a hanger 20, connected by links 19 to a lever 16, which has a notched segment 17, supported on the main frame 12 of the machine, said segment being arranged to be engaged by the latch of the lever. The hangers 20 are bolted to the front ends of the side bars 26, which are pivoted at 32 to the frames 13, so that the shovel and carrier may be swung up and down by means of the lever 16.

The endless carrier comprises chain belts 28, one at each side of the machine, between which extend rods 28ª. This carrier receives the matter dug by the shovel. It extends at the front end around a roller 23, journaled between brackets 24, which are bolted to the side bars 26.

25 represents shields, which extend along the sides of the rear belt to keep the potatoes from falling off the sides thereof.

At its rear end the carrier-belts pass around sprockets 42 and under driving-sprockets 47, which are driven from the main wheels. The belts also pass over idlers 55 and 34, which serve to keep the carrier off the ground, and the latter also serves to hold the carrier-chains in engagement with the driving-sprockets 47.

To agitate the carrier-belt as it runs, an agitator 29 is employed. This is hung under the upper run of the belt between the side bars 26 and turns by contact with the belt. It has arms 29ª set oppositely at each end, and as the belt is drawn thereover these arms act to lift and shake the belt. Owing to the opposite arrangement of the arms the lift at each side is alternate, so that the belt has a compound up-and-down or rocking agitation, which is effective in ridding the potatoes of the associated dirt, which drops between the bars of the carrier.

The main wheels are indicated at 63, and each has a main driving-sprocket 30 secured to the spokes thereof. The main driving-chains 33 pass around these sprockets and around sprockets 35 on the same shaft as the sprockets 47 and thence around idler-sprockets 46. The sprockets 46, and also the sprockets 42, are carried by arms 40, which are adjustable for the purpose of tightening the carrier-belt and also the main driving-chains 33. The main driving-chain, it is to be noticed, passes around under the sprocket 35 and around sprocket 46, the sprocket 35 being the clutch-sprocket to throw the carrier in and out of gear. Said arms 40 are hinged at their lower ends to the rear ends of the bars 13 and are connected at the upper ends to the rear ends of the frames 12 by slot-and-bolt connection at 14. The arms can thus be swung in either direction to tighten or otherwise adjust the chains.

For throwing the parts in and out of gear a clutch 36 is employed, operating in connection with the wheel 35 and the shaft 47ª, on which the drive-wheels 47 of the endless carrier are mounted. This clutch may be of any suitable or desired construction and adapted to allow back slip.

It will be noted that the endless carrier is not driven by the sprockets at the end thereof, but by an intermediate sprocket, which is connected by a clutch to the sprocket driven from the main wheel. This construction is very advantageous. It allows the carrier-belt to be tightened without affecting the drive-sprockets, and it allows the main drive-chain to be tightened without affecting the driving mechanism for the carrier. These results are effected by the construction shown.

What I claim as new, and desire to secure by Letters Patent, is—

1. In a potato-digger, in combination, a frame having upper bars 12, bars 13 secured thereto and inclined down and back, the side bars 26 pivoted to said bars 13, an endless carrier supported by said side bars, and arms 40 extending between the rear ends of the bars 12 and 13 and supporting the rear end of the carrier, and having wheels around which the carrier extends, and adjustable to vary the tension of the carrier.

2. In a potato-digger, the combination with a main drive-chain and an endless carrier, of an adjustable arm, separate shafts mounted upon the arm, sprockets carried by the shafts and around which the drive-chain and the carrier respectively extend, another shaft having thereon a sprocket engaged with the chain and another engaged with the carrier, and a clutch between the last-mentioned shaft and one of the sprockets thereon.

In testimony whereof I have signed my name to this specification in the presence of two subscribing witnesses.

JOHN HIST.

Witnesses:
JOHN A. BOMMHARDT,
LOTTIE NEWBURN.